US005275870A

United States Patent [19]

Halope et al.

[11] Patent Number: 5,275,870

[45] Date of Patent: Jan. 4, 1994

[54] WATERMARKED PLASTIC SUPPORT

[75] Inventors: Christophe Halope, Chambly; Alain Barthez, Paris; Jean-Paul Menez, Verrieres-Le-Buisson, all of France

[73] Assignee: Arjo Wiggins S.A., Paris, France

[21] Appl. No.: 849,383

[22] PCT Filed: Nov. 13, 1990

[86] PCT No.: PCT/FR90/00808

§ 371 Date: May 7, 1992

§ 102(e) Date: May 7, 1992

[87] PCT Pub. No.: WO91/07285

PCT Pub. Date: May 30, 1991

[30] Foreign Application Priority Data

Nov. 14, 1989 [FR] France ................ 89 14925

[51] Int. Cl.[5] ................ B32B 3/00

[52] U.S. Cl. ................ 428/199; 428/325; 428/328; 428/500

[58] Field of Search ................ 428/195, 199, 500, 328, 428/325

[56] References Cited

U.S. PATENT DOCUMENTS 2,331,575 10/1943 Simons ................ 428/199
4,520,083 5/1985 Simon et al. ................ 428/195
5,085,936 2/1992 Herdman ................ 428/199

FOREIGN PATENT DOCUMENTS 2229517 12/1972 Fed. Rep. of Germany .
7716857 6/1977 France .
2159463 5/1985 United Kingdom .

*Primary Examiner*—Edith Buffalow
*Attorney, Agent, or Firm*—Bacon & Thomas

[57] ABSTRACT

The invention concerns an imprintable, flexible, synthetic support bearing at least one authentication or security mark.

This support comprises:

a substrate of synthetic material at least one mark on at least one face of the support and consisting of at least one layer of a composition altering the substrate opacity, at least one layer of an imprintable pigment composition deposited on the face bearing the mark and optionally also on the substrate face without the mark, the mark being barely or not at all visible in reflected light and perfectly visible in transmitted light.

Application to the security of synthetic paper.

13 Claims, No Drawings

WATERMARKED PLASTIC SUPPORT

The present invention concerns a watermarked, printable plastic support containing security markings which look like watermarks. Hereafter these markings are called pseudo-watermarks.

It is commonplace to watermark paper. Paper watermarking may be carried out in different ways depending on making "genuine" ones or artificial ones called "pseudo watermarkings".

It is known that trust papers and securities comprise watermarks which are made during the manufacture of the sheet of paper by using round forms impressing hollowed or raised means or using watermarking rollers comprising hollowed and/or raised drawings in association with a flat bench (Fourdrinier machine). An image is then obtained which when looked at against the light will appear clear if the watermarking roller comprises a raised design or dark if its design is hollowed. The clear zones arise from the thickness and the fiber density of the sheet being less than in the areas where the watermarking roller did not print. On the other hand, the dark zones arise from more substantial sheet thickness and fiber density.

It is also known to make pseudo watermarks by printing or depositing a composition, which as a rule is fatty, that shall render the sheet of paper permanently transparent. Transparency also may be achieved by means of a hot-melt substance; this substance is a polyethylene in the European patent application 203,499.

A pseudo watermark may also be produced in a sheet of paper by rendering specific zones more opaque with the use of an opaquing agent.

French patent application 2.353,676 describes a method using an opacity-controlling agent, that is one that increases the opacity, or, alternatively, decreases it.

This agent may be an aqueous suspension of a pigment or filler or a solution of a chemical compound, of a dyed compound or of a dye. While the sheet is being manufactured, this agent is applied to the fiber web before it is removed from the wire cloth so that said agent enters the web interstices and, following drying, shall have altered the opacity of the web being treated in the desired zones.

This method entails the drawback of requiring special rolling equipment to apply this agent and the use, preferably, of a suction device to cause the agent to enter the web interstices.

This complex procedure results in non-homogeneous pseudo watermarks because the deposition is uneven.

U.S. Pat. No. 4,520,063 describes a synthetic-resin sheet with security markings similar to watermarks. Two dyes with different rates of migration are applied to the sheet, the migration of the quicker-migrating dye being stopped by crosslinking due to a crosslinking agent contained in the sheet or added to the dye. Under reflected light, a pattern assuming the color of this dye will be observed, whereas observation under transmitted light shows mixed colors.

It is difficult to make a pseudo watermark in this manner in a plastic sheet because it requires a non-obvious selection of dyes with differing rates of migration into a specific material and it requires crosslinking.

It may be advantageous to replace the sheet of paper with a sheet of synthetic material, which consists essentially of cellulose fibers for example, in the manufacture of long lasting documents or documents which must withstand highly adverse handling. Such documents, for instance may be diplomas required to last at least the life of their holders. Other documents may be securities, banknotes, identification cards and passports.

It is important that such documents bear items of authenticity, in particular watermarks, as the paper documents do.

The watermarking techniques described above in relation to paper can be applied only with difficulty to plastic sheets. They are particularly inapplicable to sheets having a thermoplastic-film base.

Accordingly, one object of the invention is to create a plastic sheet which can be imprinted and which comprises authentication or security markings that are hardly visible, or not at all, in reflected light, and which are perfectly visible in transmitted light.

Another object of the invention is to prevent counterfeiters or forgers from reproducing such authentication markings.

A third object of the invention is to provide a rapid and economical manufacturing method for such a sheet.

Applicants have surprisingly discovered that a sheet, in particular a sheet of synthetic material, can be pseudo-watermarked by deposition of, or by imprinting, an opacity modifying composition at specific sites of a synthetic substrate. Thereupon, this composition is covered with an imprintable, pigmented layer. Remarkably, the markings so obtained are hardly or not at all visible in reflected light but are visible in transmitted light. This method is advantageously simple. Another significant advantage of this method is the ability to make pseudo watermarks in several shades (graduating from light to dark, for instance shaded); this type of watermark is more difficult to forge and contains more authenticity data than a single-shade watermark.

Moreover, because an imprintable, pigmented layer is deposited last, the markings so made are not easily accessible to a counterfeiter.

In the case of paper, counterfeiters make forged watermarks by depositing a composition which alters the opacity at selected, suitable sites on the surface of a sheet of paper. In the case of the invention, which relates to a synthetic sheet, this type of forgery is impossible. In fact, if the counterfeiter were to commercially acquire a synthetic sheet coated in an imprintable manner, for instance with POLYART ® from ARJOBEX Co., he would be faced with a number of alternatives.

In the first place, he may deposit an opacity-altering composition on certain areas of the surface of such a sheet to reproduce the watermark. However, in that case, the markings so made will be quite visible in reflected light.

In the second place, the counterfeiter might dissolve the printable surface layer of the POLYART ® using a solvent and then deposit an opacity-altering composition at the desired sites, whereupon he would again deposit the imprintable coating on the surface.

In the third place, the counterfeiter might acquire a synthetic sheet not yet clad with the imprintable layer, deposit an opacity-altering composition, and then deposit an imprintable surface layer.

However, all these conditions are extremely difficult to meet and proper reproduction of the pseudo watermark, in particular if there are several shades, will be impossible. The method employed to make secure a plastic sheet according to the invention is thus especially well suited to an imprintable synthetic film.

Accordingly, the object of the invention is to create an imprintable, flexible, synthetic support bearing at least one security or authentication mark, said support comprising:

a substrate of synthetic material, at least one mark deposited or imprinted on at least one of the substrate faces, said mark comprising at least one composition altering the substrate opacity, at least one layer of an imprintable, pigmented composition covering the mark, said layer being deposited on the face bearing the mark and optionally on the face of the substrate which lacks a mark; the mark being hardly or not at all visible in reflected light and perfectly visible in transmitted light.

The mark is monochromatic or polychromatic.

The opacity-altering composition is a pigmented and/or dyed and/or fluorescent composition which can be prepared in an aqueous medium, in a non-aqueous solvent medium, or in a mixed water-solvent medium. When this composition is a pigment, preferably it contains a mineral filler such as titanium dioxide. It may also contain colorful pigments. There is no restriction on the list of dyes suitable for the invention. The opacity-altering composition comprises at least one mineral filler and/or at least one pigmented and/or soluble dye and/or at least one fluorescing agent, at least one binder or lacquer, optionally at least one dispersant and other additives.

Advantageously, the opacity-altering composition is a dyed and/or fluorescent ink.

Any synthetic based substrate is suitable for the invention. Preferably, a film or sheet consisting of at least one polyolefin, in particular polyethylene or polypropylene, is used. More specifically, the synthetic based substrate consists essentially of polyethylene that was extruded and stretched biaxially. Advantageously, this film may have been treated chemically or by corona discharge at its surface in order to improve its receptivity for the various compositions by which it is coated.

Preferably the imprintable, pigmented composition comprises a filler, which is preferably a mineral filler, at least one dispersant, at least one binder, optionally: an insolubilizer, optionally an antistatic agent, optionally a pH regulator, and/or other additives. Such additives for instance may be anti-foaming agents, viscosity regulators, or waxes.

For example, such a pigment composition may be selected from those described in the British patent 2,177,413. Other formulas for improving imprintability may be suitable. Certain compositions kill the fluorescence of the sub-layer. One of ordinary skill in the art would know how to match this composition to the selected sub-layer.

The binder of the opacity-altering layer may for example be selected, in non-restrictive manner, from the following:

starches and optionally modified starches;
soy proteins;
cellulose derivatives, in particular a carboxymethyl cellulose;
alginate;
latex, especially synthetic latex, containing
 styrene-butadiene copolymers, which are optionally carboxylated, and
 acrylate copolymers;
polyvinyl alcohol;
vinyl resins;
epoxy resins; and
phenol-melamine resins and their mixtures.

The pigment fillers used to make the opacity-altering layer may for example be selected from the following:

titanium oxides;
calcium carbonates;
clays;
aluminum hydroxides;
calcium sulfoaluminates (satin white);
barium sulfates (baryta white);
talcs;
kaolins;
silicas; and
silicates other than talcs and kaolins.

These fillers are fine powders (mean grain size less than 10 μm as a rule). However, plastic pigments also may be used (powders of acrylonitrile-vinylidene or polystyrene copolymers, for example).

The dyed pigments (or the pigment dyes) may for example be selected from the following in non-restrictive manner:

iron oxides (for instance, red, black);
chromium oxides;
phthalocyanins (blue, green);
anthraquinones (for instance violet);
quinacridones;
carbon black;
chromates of lead, of calcium, of barium, of strontium;
lead chromomolybdates;
lead sulfoselenides;
monoazoic compounds, naphthamide derivatives, naphthaorthotoluidine derivatives, acetoacetyl derivatives; and
disazoic compounds, benzidine derivatives.

Other suitable dyes are those soluble in an aqueous medium and as a rule are divided into three categories:

the basic dyes: as a rule these are hydrochloric salts of basic dyestuffs (for instance fuchsin, malachite green); these dyes frequently assume azoic or triphenyl methane configurations;

the acid dyes: as a rule these are alkaline salts, in particular of sodium or potassium, of combinations of diazoic compounds and sulfonic acid; and the direct dyes, also called substantive dyes, which are related to the acid dyes; these are foremost sodium salts of azoic combinations with carboxylic or sulfonic groups.

These diverse dyes and/or pigments may be in combination. It may be necessary to take into account the pH of the ultimately deposited printable layer when selecting these dyes or pigments which may be unstable under some conditions.

A priori, any fluorescent agent is suitable, however such an agent must be tested because some are fluorescent only under given conditions. It is perhaps also important that these agents be fast under visible or invisible light depending on the use of the final product. In particular phosphorescent agents are not excluded.

The fluorescent agents may for example be selected from the following group, but are not limited thereto:

the fluorescent-bleaching agents conventionally used in paper to increase its whiteness; such may be derivatives of diaminostilbene-disulfonic acid, in particular derivatives of 4,4'diaminostilbene-2,2'sulfonic-acid, or of nitrogenous heterocycle derivatives, rare-earth chelates (for instance europium-doped yttrium oxysulfide) or other doped products (doped alkaline-metal fluorides, doped ferrites), zinc sulfides, or (copper activated) cadmium and zinc sulfides, coumarin derivatives,
disulfonated B-naphthol derivatives,
disazoic derivatives,
fluorescein, eosin, and optionally mixtures thereof.

Metal, magnetic pigments of infra-red luminescent products may also be used.

Zinc-sulfide based pigments emitting at various lengths are described in the patent applications EP A 34,059; EP A 78,538 and EP A 91,184 filed by KASEI OPTONIX.

A preferred process for manufacturing the sheet of the invention consists in imprinting at least once, preferably by photo-etching, at least one face of the base plastic substrate by means of at least one opacity-altering composition and then in coating one, or the other, or both faces with the imprintable pigmented layer with a coating means which is conventional in printing or papermaking.

Other methods for depositing the opacity-altering composition borrowed for instance from the printing or graphic arts may be suitable also; however, photo-etching provides the most uniform and regular deposition.

To make a watermark having several shades, the opacity-altering composition is deposited once or several times at selected sites over the first deposition. The same composition or another may be used.

Other security elements may be integrated into the base film and/or into the imprintable layer and/or into the opacity-altering composition.

The mark obtained according to the invention form a pseudo watermark which also may be detected by a watermark reading and/or recognizing device. When the markings are fluorescent, they may be detected and observed at the document surface using UV light.

The invention is elucidated by means of the Examples below provided in illustrative and non-limiting manner.

EXAMPLES

In the Examples below, the base plastic substrate is a biaxially stretched film composed in the main of high-density polyethylene commercially sold as Polyart ® by ARJOBEX Co.

EXAMPLE 1

The following opacity-modifying composition is made in aqueous medium.

| Commercial parts | by weight |
|---|---|
| water | 26 |
| dispersant: aqueous solution with 50% of an ammonium polyacrylate DISPEX A40 marketed by Allie Colloids Ltd (UK) | 0.3 |
| mineral filler: titanium dioxide powder | 39 |
| 1 N sodium hydroxide | 1 |
| binder: aqueous dispersion of acrylate copolymer with about 50% dry matter marketed by BASF as ACRONAL S360D | 32 |
| insolubilizer: 30% solution of an ammonium and zirconium carbonate (AZC) marketed by Magnesium Electron Ltd (UK) | 1.1 |
| Nisrosine W Black marketed by Bayer | 0.01 |

This opaquing composition is deposited on a plastic film using a lab photoetching machine so as to imprint a pattern.

The film so printed is then coated on both faces with an imprinted pigment composition using an air brush; the pigment filler is a mixture of calcined kaolin and calcium carbonate powder.

The final product is a plain pattern invisible in reflected light and visible in transmitted light.

The product of the invention therefore is an imprintable, flexible, synthetic support comprising a pseudo watermark permitting the product to be authenticated.

EXAMPLE 2

In addition to the procedure of Example 1, an optical bleach is added to the opaquing agent. The optical bleach is marketed as BLANKOPHOR P by Bayer; it is added as 0.24 parts by commercial weight.

In this case a fluorescent pseudo watermark is achieved.

The final support may be readily authenticated in UV light.

EXAMPLE 3

The opacity-altering composition is prepared in a non-aqueous solvent medium and contains:

| | Parts in commercial weight |
|---|---|
| organic solvent: ethyl acetate | 21.5 |
| mineral filler: titanium dioxide powder | 28.5 |
| photo-etch varnish marketed by SICPA (Switzerland) #53575 | 50 |
| dye: black soluble dyestuff marketed by MORTON CHIMIE (France) as OISOL NUSIAN BT | 0.01 |

The final, imprintable support is produced as in Example 1. This support comprises a dark pseudo watermark.

EXAMPLE 4

The opacity-altering composition is prepared in a non-aqueous solvent medium and contains:

| | Parts by commerical weight |
|---|---|
| an organic solvent: methylethyl ketone | 30 |
| a white ink for photo-etching: SIPCA #60498 | 110 |
| a yellow fluorescent pigment marketed by HOECHST as LUMILUX | 2 |

A final, imprintable support is produced as in Example 1. The support is authenticatable by a fluorescent pseudo watermark.

EXAMPLE 5

Example 1 is repeated, and a violet dye VISCOFIL 4 RL PATE marketed by SANDOZ is added to the opaquing agent in the amount of 0.08 parts by commercial weight.

A colored pseudo watermark is obtained.

EXAMPLE 6

The opaquing composition of Example 1 is reproduced, with substitution of the black dye by a green UNIPERSE GP dye marketed by CIBA GEIGY. 0.32 parts by commercial weight are added.

A first pattern is deposited using a spray gun. The opaquing composition is deposited on part of this pattern, using the spray gun again.

Finally, the imprintable, pigmented layer is deposited as in Example 1.

A colored pseudo watermark is obtained, comprising a light and a darker part; this watermark therefore comprises two shades.

We claim:

1. An imprintable, flexible synthetic support bearing at least one authentication or security mark, said support comprising:

a substrate of synthetic material, at least one mark deposited or imprinted on at least one face of the substrate, said mark comprising at least one composition altering the substrate opacity, at least one layer of an imprintable pigment composition covering the mark, said layer being deposited on the face with the mark and optionally on the face of the substrate without marking, the mark being barely visible in reflected light and perfectly visible in transmitted light.

2. Support according to claim 1, wherein the marking is monochromatic or polychromatic.

3. Support according to claim 1, wherein the opacity-altering composition contains at least one mineral filler and at least one binder.

4. Support according to claim 1, wherein the opacity-altering composition contains at least one soluble dye or a pigment colorant.

5. Support according to claim 1, wherein the opacity-altering composition contains a fluorescing agent.

6. Support according to claim 1, wherein the opacity-altering composition is a dyed or fluorescent ink.

7. Support according to claim 1, wherein the synthetic substrate is a film or a sheet composed of at least one polyolefin.

8. Support according to claim 7, wherein the polyolefin is polyethylene or polypropylene.

9. Support according to claim 7, wherein the substrate consists essentially of high-density polyethylene, is formed by extrusion, is biaxially stretched and is optionally surface-treated with corona discharges.

10. Support according to claim 1, wherein the imprintable pigment composition comprises a mineral filler, at least one dispersant, at least one binder, optionally an insolubilizer, optionally an anti-static agent, and optionally a pH regulating agent.

11. A method of manufacturing a support according to claim 1, wherein at least one opacity-altering composition is deposited at specific sites on at least one of the faces of the synthetic substrate to form at least one authentication or security mark and wherein an imprintable, pigmented layer is deposited on the face with the mark and optionally also on the other side.

12. Method according to claim 11, characterized in that the opacity altering composition is deposited by photo-etching.

13. Method according to claim 11, wherein the imprintable pigmented layer has a dry specific weight between 5 and 30 $g/m^2$ and preferably about 10 $g/m^2$.

* * * * *

UNITED STATES PATENT AND TRADEMARK OFFICE
CERTIFICATE OF CORRECTION

PATENT NO. : 5,275,870

DATED : January 4, 1994

INVENTOR(S) : Christopher HALOPE et al.

It is certified that error appears in the above-identified patent and that said Letters Patent is hereby corrected as shown below:

Column 1, line 14, change "round forms" to --cylinder machines--.
lines 65-67, change "to replace the sheet of paper with a sheet of synthetic material, which consists essentially of cellulose fibers for example" to --to replace the sheet of paper which consists essentially of cellulose fibers for example with a sheet of synthetic material--.

Column 5, Example 1, change "Allie Colloids" to --Allied Colloids-- and change "Nisrosine" to --Nigrosine--.

Signed and Sealed this

Ninth Day of August, 1994

Attest:

Bruce Lehman

BRUCE LEHMAN

*Attesting Officer*

*Commissioner of Patents and Trademarks*